United States Patent
Rivera et al.

(10) Patent No.: US 7,322,786 B1
(45) Date of Patent: Jan. 29, 2008

(54) MOBILE LOADER FOR TRANSFER OF CONTAINERS BETWEEN DELIVERY VEHICLES AND MARINE TERMINAL CRANES

(75) Inventors: Rafael Rivera, Magnolia, NJ (US); Christopher Clemmer, Allentown, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 353 days.

(21) Appl. No.: 10/758,555

(22) Filed: Jan. 16, 2004

Related U.S. Application Data

(60) Provisional application No. 60/506,464, filed on Sep. 26, 2003.

(51) Int. Cl.
*B60P 3/00* (2006.01)
*B60P 9/00* (2006.01)
*B65G 67/60* (2006.01)

(52) U.S. Cl. .................. 414/460; 414/140.3; 414/392; 414/631; 414/347

(58) Field of Classification Search ................ 414/342, 414/347, 137.1, 391, 631, 392, 630, 222, 414/140.3, 141.3, 803; 187/222; 212/344
See application file for complete search history.

(56) References Cited

U.S. PATENT DOCUMENTS

| | | | | |
|---|---|---|---|---|
| 1,990,539 A * | 2/1935 | Fildes | ........................ | 212/326 |
| 3,602,375 A * | 8/1971 | Martinson | .................... | 212/198 |
| 4,106,639 A * | 8/1978 | Montgomery et al. | ... | 414/141.3 |
| 4,293,077 A * | 10/1981 | Makino | ....................... | 212/325 |
| 4,431,359 A * | 2/1984 | Toniolo | .................... | 414/139.9 |
| 5,039,275 A * | 8/1991 | Ide | .............................. | 414/803 |
| 5,105,915 A * | 4/1992 | Gary | .......................... | 187/200 |
| 5,343,739 A * | 9/1994 | Curry | ......................... | 212/280 |
| 5,775,866 A * | 7/1998 | Tax et al. | ................. | 414/140.3 |
| 6,880,712 B2 * | 4/2005 | Uchida et al. | .............. | 212/276 |
| 6,968,963 B1 * | 11/2005 | Zakula et al. | ............... | 212/270 |

* cited by examiner

*Primary Examiner*—Saul Rodriguez
*Assistant Examiner*—Gregory W Adams
(74) *Attorney, Agent, or Firm*—Dave A. Ghatt; Jacob Shuster

(57) ABSTRACT

A mobile loader is driven to a dockside location underlying the spreader bar of a marine terminal crane. A delivery vehicle such as a train or a truck is driven into the loader at such dockside location so that containers maybe transferred between the delivery vehicle and a platform located within the loader in lateral adjacency to the delivery vehicle. Motorized devices are provided for respectively transferring containers between the delivery vehicle and the platform, aligning the platform below the spreader bar, elevating the platform toward the overlying crane spreader bar to reduce its required descent for attachment to the container and aligning the crane spreader bar as it descends onto a container. A sensor grid is provided in the loader for sensing variations in size and location of containers on the delivery vehicle relative to a hoist and the crane spreader bar for controlling its adjustment to provide for precise placement of containers on the platform in underlying relation to the crane spreader bar by the motorized devices.

2 Claims, 4 Drawing Sheets

MOBILE LOADER FOR TRANSFER OF CONTAINERS BETWEEN DELIVERY VEHICLES AND MARINE TERMINAL CRANES

CROSS-REFERENCE TO RELATED APPLICATION

This application claims the benefit of U.S. Provisional Application No. 60/506,464 filed Sep. 26, 2003, entitled "Mobile Loader for Transfer of Containers Between Delivery Vehicles and Marine Terminal Cranes", incorporated herein by reference.

It is an objective of the present invention to efficiently transfer loaded containers between land-based vehicles and dockside marine terminal cranes for loading or unloading of dockside sea vessels.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

Currently the transfer of loaded containers between land and ships involves the use of a relatively large marine terminal crane having a single rail for guided travel of a trolley along the length of a boom. A spreader bar is suspended from the trolley through which the containers are raised and lowered by the crane during performance of a time-consuming load transfer process. For small scale ports with low demands, a highly efficient load transfer performance may not be required. However, at larger ports the crane has been a main bottleneck in disrupting and rendering inefficient marine terminal activities related to loading and unloading of shipping vessels. Such activities involve the crane operator simply lowering the crane spreader bar so as to lock onto a container anywhere below the crane. Often a time consuming process is involved because multiple attempts are required before successful landing of the spreader bar on the container and lock on is achieved leading to a line-up of many trucks awaiting pick up of containers from the crane to thereby delay use of such trucks in acquiring another container.

It is therefore an important object of the present invention to provide for more efficient and less time consuming transfer of the containers and more productive use of the crane and the trucks, while using currently designed marine terminal cranes.

SUMMARY OF THE INVENTION

Pursuant to the present invention a mobile loader is utilized to aid in the transfer of containers between delivery vehicles such as trains or trucks and dockside cranes. A motor cab at the front of the loader enables its driver to maneuver the loader from a stowage location to a delivery location such as the crane. A platform on the loader is adjustably positioned so as to permit movement of the loader below cross beams of the crane to a position of rest. The platform may then be raised so as to decrease the distance for descent of the crane spreader bar onto a container transferred to the platform from a delivery truck driven into the loader. The container is transferred from the truck by initial lifting thereof from the truck chassis by a sensor guided hoist which is then laterally aligned with the center of the platform before the container is set down. Twist locks may then be attached to or detached from the container. Guide rails are maneuvered into place at the ends of the container for subsequent rail guided pick-up thereof by the crane spreader bar to complete a process for transfer of containers from the delivery truck to the shipping vessel. Such container transfer process may be reversed to aid in the unloading of containers from the shipping vessel and transfer onto the delivery truck for return to the stowage location.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
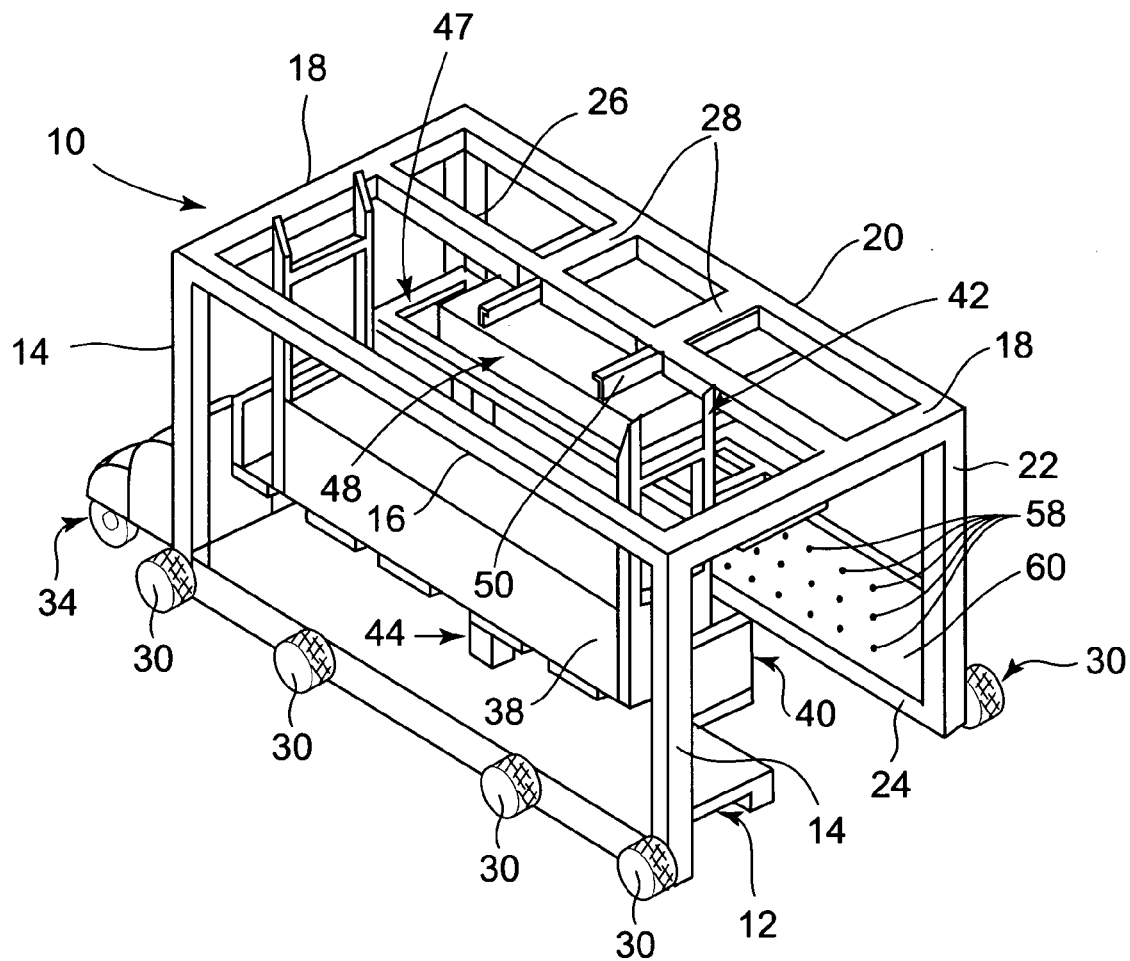
FIG. 1 is a perspective view of a mobile loader with a container positioned therein.
Figure 2:
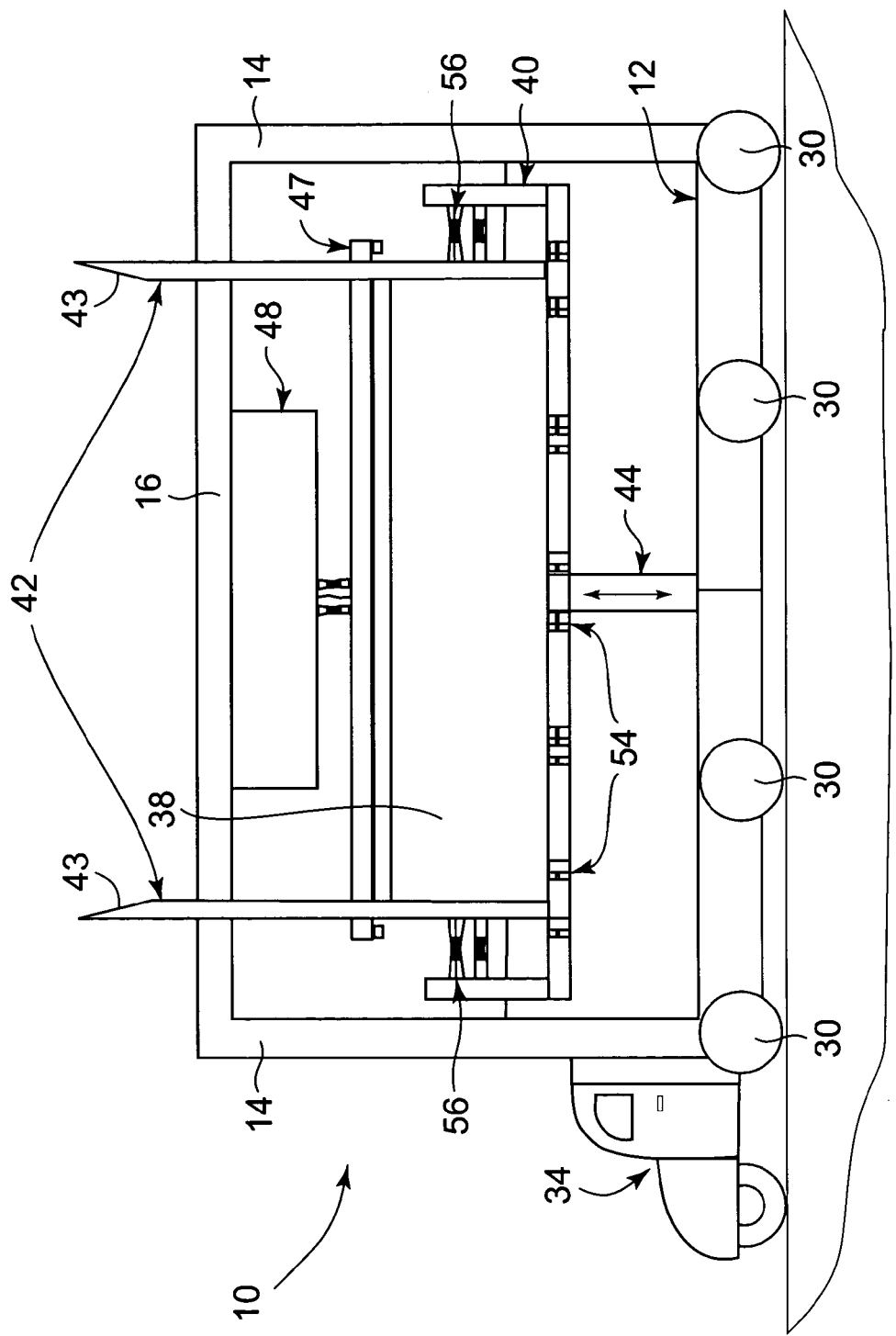
FIG. 2 is a side elevation view of the loader shown in FIG. 1.
Figure 3:
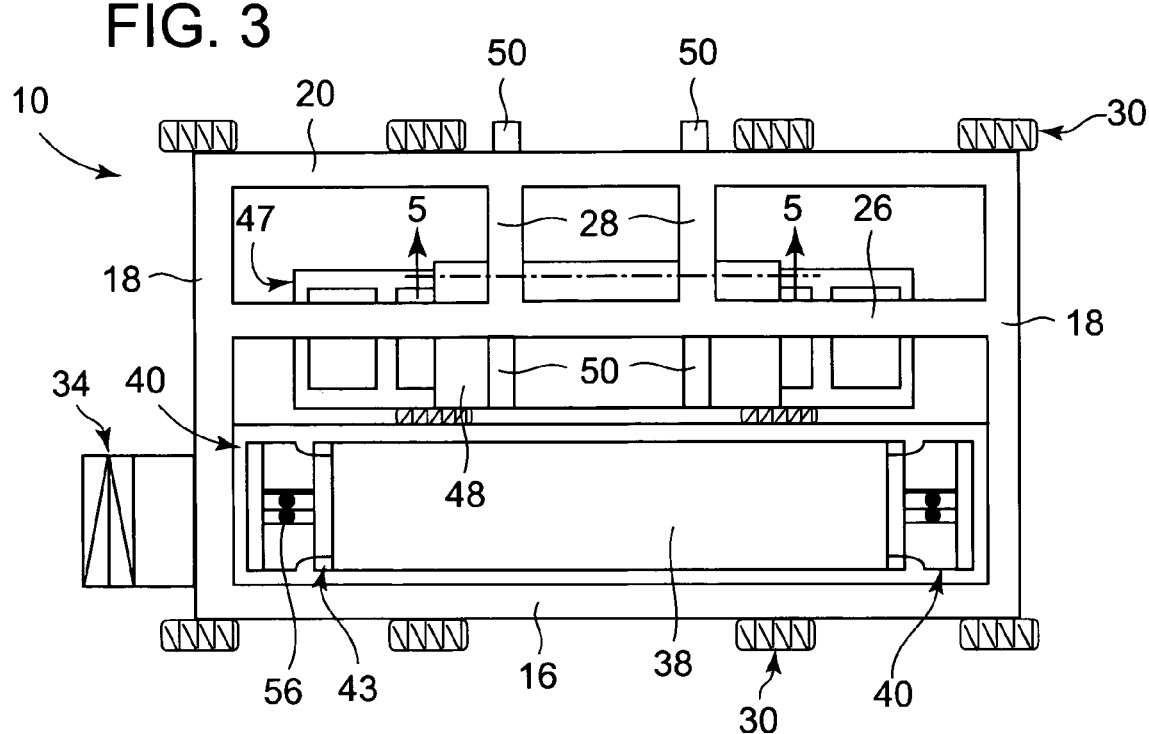
FIG. 3 is a top plan view of the loader as shown in FIGS. 1 and 2.
Figure 4:
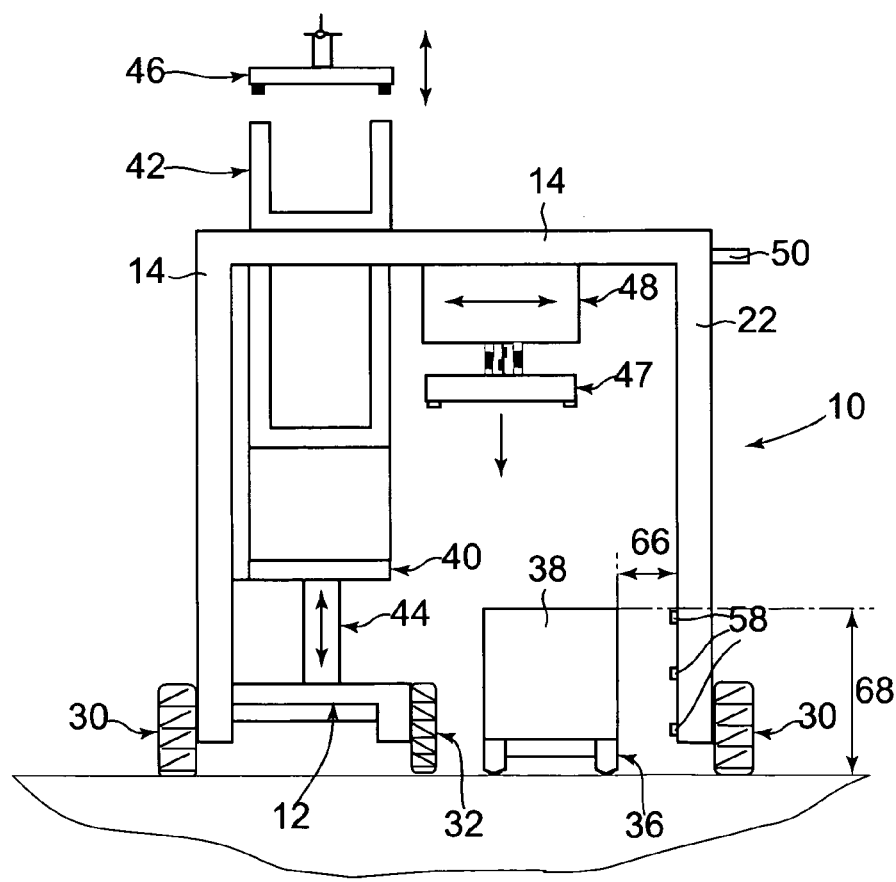
FIG. 4 is an end view of the mobile loader corresponding to that shown in FIGS. 1-3, with the container on a delivery truck positioned within the loader.

Referring now to the drawing in detail, FIGS. 1-4 illustrate a mobile loader 10 having an elongated bottom support 12 connected at opposite ends thereof to vertical frame posts 14 with upper ends thereof interconnected by a horizontal frame bar 16 from which a pair of end frame bars 18 extend laterally to another upper horizontal frame bar 20 connected at its opposite ends through vertical frame posts 22 to a lower horizontal frame bar 24 in laterally spaced relation to the bottom support 12. An intermediate horizontal frame bar 26 interconnects the upper end frame bars 18 as shown in FIGS. 1 and 3, with a pair of longitudinally spaced intermediate connecting bars 28 extending between the frame bars 26 and 20. A plurality of wheels 30 are mounted on the lower horizontal bar 24 and the bottom support 12 so as to provide wheeled maneuverability for the loader 10. Additional wheels 32 are also mounted on the bottom support 12 as shown in FIG. 4. At the forward end of the loader 10 as shown in FIGS. 1, 2 and 3, a motor cab 34 is attached thereto in alignment with the bottom support 12.

As shown in FIG. 4 a delivery truck 36 may be driven with a container 38 on its chassis to a position of rest within the loader 10 laterally spaced from the bottom support 12. The container 38 on the truck 36 may accordingly be readily transferred to a platform 40 positioned within the loader 10 above the bottom support 12 as shown in FIGS. 1, 2 and 3.

Associated with the platform 40 is a vertical guide rail assembly 42 adjustably positioned as hereinafter explained. The platform 40 may be vertically raised by a lift actuator 44 of a suitable type having for example hydraulic or electric motors associated therewith with gears, pistons, scissor lifts etc. The platform 40 with the container 38 placed thereon may thereby be adjustably lifted upwardly to decrease the distance for descent of the overlying crane spreader bar 46 as shown in FIG. 4.

Figure 5:
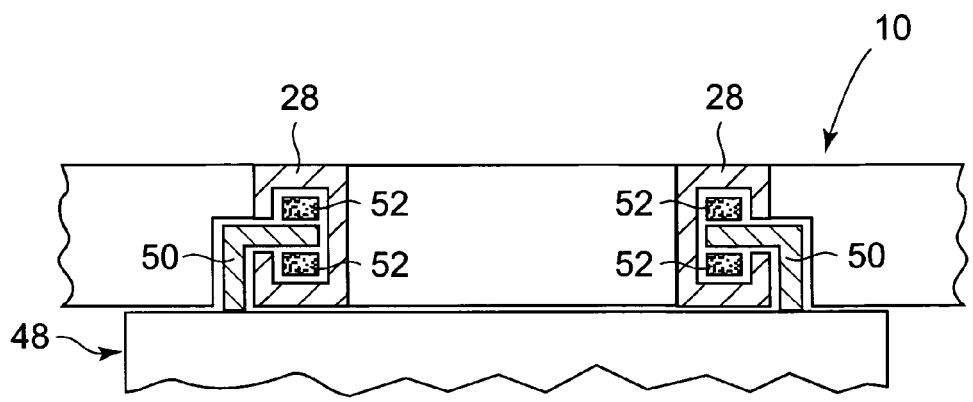
FIG. 5 is a partial section view taken substantially through a plane indicated by section line 5-5 in FIG. 3.

Transfer of the container 38 from the chassis of the delivery truck 36 to the platform 40 may be effected by means of a loader spreader bar 47 connected to and underlying a motorized lift hoist 48 as shown in FIGS. 2 and 4. When the container 38 on the truck 36 is attached to the spreader bar 47 lowered by the lift hoist 48, it is lifted off the truck chassis to a position just above the bottom of the platform 40 and then laterally displaced by suitable motorized means associated with the hoist 48 toward the platform 40 along connecting bars 28 through which lateral hoist rails 50 extend as shown in FIGS. 3 and 5. Hoist rail bearings 52 within the connecting bars 28 provide guiding support through the lateral hoist rails 50 attached to the hoist 48 during lateral movement to transfer the container 38 attached to its overlying spreader bar 47 to its proper position just above the platform 40 and underlying the crane spreader bar 46. Once so positioned above the platform 40, the container 38 may be lowered onto the platform 40. The loader spreader bar 47 is then detached and the hoist 48 is returned to its position above the delivery truck 36. As generally known in the art, twist locks may then be attached to or detached from the container 38. In order to accommodate insertion or removal of such twist locks if utilized on the container 38, the platform 40 is formed with access cut-outs 54 as shown in FIG. 2 which also shows motorized actuators 56 at opposite ends of the platform 40 for longitudinal adjustment of the guide rails 42 to abut the ends of the container 38 as shown in FIG. 2. The guide rails 42 have flare shaped ends 43 which redirect the crane spreader bar 46 during descent between the rails 42 and into direct alignment with the container 38.

Figure 6:
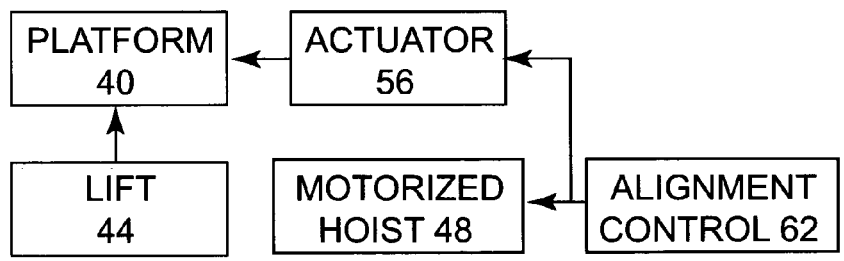
FIG. 6 is a block diagram illustration of an alignment control system associated with certain components of the loader illustrated in FIGS. 1-5.
Figure 6:
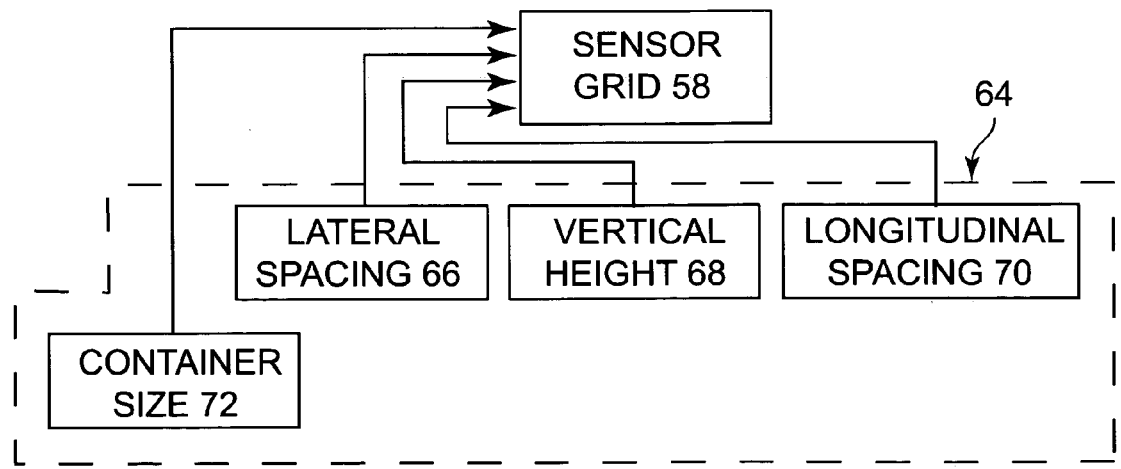

Also shown in FIGS. 1 and 4 is a sensor grid 58 mounted on a plate 60 attached to the frame post 22 and frame bar 24 of the loader 10. The sensor grid 58 is operationally connected to the hoist 48 and the actuators 56 as diagrammed in FIG. 6 through alignment control 62 through which variations in measurements 64 are sensed by the grid 58 with respect to the container 38 on the chassis of the delivery truck 36 at rest in the loader 10 as shown in FIG. 4 and denoted in FIG. 6. Such measurements may include: lateral spacing 66, vertical height 68, longitudinal spacing 70 relative to the platform 40 within the loader 10 and container size 72.

It will be apparent from the foregoing description that the delivery truck 36 carrying the container 38 may be driven to the rest position within the loader 10. The motorized hoist 48 then automatically adjusts positioning of the loader spreader bar 47 over the container 38 on the truck 36 in response to container alignment measurements 64 sensed through the sensor grid 58. The hoist 48 is then attached through the spreader bar 47 to the container 38 for pick up, guided maneuvering thereof and positioning of the container 38 onto the platform 40 underlying the crane spreader bar 46. The motorized actuators 56 longitudinally adjust the guide rails 42 so as to abut the ends of the container 38 as the crane spreader bar 46 descends for pick up of the container 38 from the platform 40 aligned therebelow. The descending crane spreader bar 46 is maintained perfectly aligned with the container 38 through the flare-shaped guide rail ends 43 before pick-up. While awaiting such pick up of the container 38 from the platform 40, the emptied truck 36 may be driven away from the loader 10 for return to the container stowage location as another container loaded truck is driven into and positioned within the loader 10 for repetition of the container transfer process. Such container transfer process may be reversed to also aid in the unloading of containers from the sea vessel. Thus, the mobile loader 10 in implementing more efficient transfers of containers between delivery trucks and a marine terminal crane reduces container transfer time and delivery truck traffic. The mobile loader 10 may alternatively be utilized for such transfer of containers between a marine terminal crane and container laden trains instead of delivery trucks.

Obviously, other modifications and variations of the present invention may be possible in light of the foregoing teachings. It is therefore to be understood that within the scope of the appended claims the invention may be practiced otherwise than as specifically described.

What is claimed is:

1. A system for transferring loaded containers between a delivery vehicle and a dockside located sea vessel by use of a crane having a spreader bar suspended therefrom, comprising:

a mobile loader including a fixedly attached motorized cab for propelling the mobile loader to a load transfer dockside location underlying the crane;

a platform in the loader, the platform having:
  an upper side,
  an underside,
  guide rails, the guide rails having flare shaped ends to position the spreader bar of the crane into alignment with the at least one container by redirecting the spreader bar to position the spreader bar into said alignment with the at least one container, the platform for carrying at least one of the containers on the upper side between the guide rails;

a motorized device mounted on the platform to move the guide rails into engagement with the at least one container;

a hoisting device for the transfer of the at least one container between the platform and the delivery vehicle positioned within the loader;

a lifting device attached to the underside of the platform at a substantially central location of the platform for elevation thereof to decrease required descent of the spreader bar from the crane toward the at least one container carried on the platform, wherein said loader further comprises:
  a wheeled frame having:
    a first pair of vertical posts, the platform adjacent to the first pair of vertical posts, and
    a second pair of vertical posts,
    an elongated bottom support attached to the first pair of vertical posts,
    the lifting device mounted on the elongated bottom support, and
    a delivery vehicle receiving opening, the delivery vehicle receiving opening adjacent the second pair of vertical posts, the system further comprising:
  a sensor grid operatively connected to the motorized device and the hoisting device for controlling said movement of the at least one container in accordance with variations in location and size thereof on the delivery vehicle and the platform, wherein the sensor grid is positioned between the second pair of vertical posts, the sensor grid also positioned adjacent the delivery vehicle opening.

2. The system of claim 1, wherein the lifting device comprises a hydraulic actuator.

* * * * *